US011361752B2

(12) United States Patent
Maruta

(10) Patent No.: US 11,361,752 B2
(45) Date of Patent: Jun. 14, 2022

(54) VOICE RECOGNITION DICTIONARY DATA CONSTRUCTION APPARATUS AND VOICE RECOGNITION APPARATUS

(71) Applicant: MITSUBISHI ELECTRIC CORPORATION, Tokyo (JP)

(72) Inventor: Yuzo Maruta, Tokyo (JP)

(73) Assignee: MITSUBISHI ELECTRIC CORPORATION, Tokyo (JP)

(*) Notice: Subject to any disclaimer, the term of this patent is extended or adjusted under 35 U.S.C. 154(b) by 120 days.

(21) Appl. No.: 16/634,988

(22) PCT Filed: Sep. 11, 2017

(86) PCT No.: PCT/JP2017/032671
§ 371 (c)(1),
(2) Date: Jan. 29, 2020

(87) PCT Pub. No.: WO2019/049364
PCT Pub. Date: Mar. 14, 2019

(65) Prior Publication Data
US 2020/0380953 A1 Dec. 3, 2020

(51) Int. Cl.
G10L 15/02 (2006.01)
G06F 40/40 (2020.01)
(Continued)

(52) U.S. Cl.
CPC ............ *G10L 15/02* (2013.01); *G06F 40/242* (2020.01); *G06F 40/40* (2020.01); *G10L 15/005* (2013.01);
(Continued)

(58) Field of Classification Search
CPC . G10L 15/1815; G10L 15/00; G06F 17/2827; G06F 17/278; G06F 17/2735; G06F 17/271; G06F 17/20
See application file for complete search history.

(56) References Cited

U.S. PATENT DOCUMENTS

2004/0102931 A1* 5/2004 Ellis ..................... A61B 5/0205
702/188
2011/0119046 A1* 5/2011 Shinozaki ............. G06F 40/242
704/2
(Continued)

FOREIGN PATENT DOCUMENTS

| JP | 2001-154691 A | 6/2001 |
|---|---|---|
| JP | 2010-33154 A | 2/2010 |
| JP | 2010-91963 A | 4/2010 |

OTHER PUBLICATIONS

International Search Report, issued in PCT/JP2017/032671, PCT/ISA/210, dated Nov. 28, 2017.

*Primary Examiner* — Anne L Thomas-Homescu
(74) *Attorney, Agent, or Firm* — Birch, Stewart, Kolasch & Birch, LLP

(57) ABSTRACT

The object of the present invention is to provide a voice recognition technique that can handle wording in other languages. The voice recognition dictionary data construction apparatus includes an attribute setting unit that sets attributes to first words that constitute a first character string representing a place name in the first language, a language conversion unit that creates a second character string by replacing the first words in the first character string with the second words without changing the attributes thereof, an order changing unit that creates a third character string by changing the word order of the second character string based on the attributes of the words of the second character string and the word order rule of place names of the second language, a phoneme data construction unit that constructs the phoneme data of the third character string.

7 Claims, 6 Drawing Sheets

(51) Int. Cl.
    *G06F 40/242*     (2020.01)
    *G10L 15/00*     (2013.01)
    *G10L 15/26*     (2006.01)

(52) U.S. Cl.
    CPC ........ *G10L 15/26* (2013.01); *G10L 2015/025* (2013.01)

(56) References Cited

U.S. PATENT DOCUMENTS

| | | | |
|---|---|---|---|
| 2011/0166859 A1* | 7/2011 | Suzuki | G10L 15/005 704/246 |
| 2011/0307241 A1* | 12/2011 | Waibel | G10L 15/06 704/2 |
| 2012/0203553 A1* | 8/2012 | Maruta | C01G 41/00 704/243 |
| 2012/0226491 A1* | 9/2012 | Yamazaki | G10L 15/06 704/8 |
| 2013/0231917 A1* | 9/2013 | Naik | G10L 15/187 704/9 |
| 2014/0365209 A1* | 12/2014 | Evermann | G06F 40/35 704/9 |
| 2015/0112759 A1* | 4/2015 | Hong | G06Q 30/0631 705/7.29 |
| 2015/0248881 A1* | 9/2015 | Holdren | G10L 15/06 704/260 |
| 2016/0336008 A1* | 11/2016 | Menezes | G10L 15/06 |
| 2016/0358596 A1* | 12/2016 | Singh | G10L 13/08 |
| 2017/0116184 A1* | 4/2017 | Bradley | G06F 40/263 |
| 2017/0287474 A1* | 10/2017 | Maergner | G06F 40/211 |
| 2018/0061398 A1* | 3/2018 | Gomez | G01S 3/8006 |

* cited by examiner

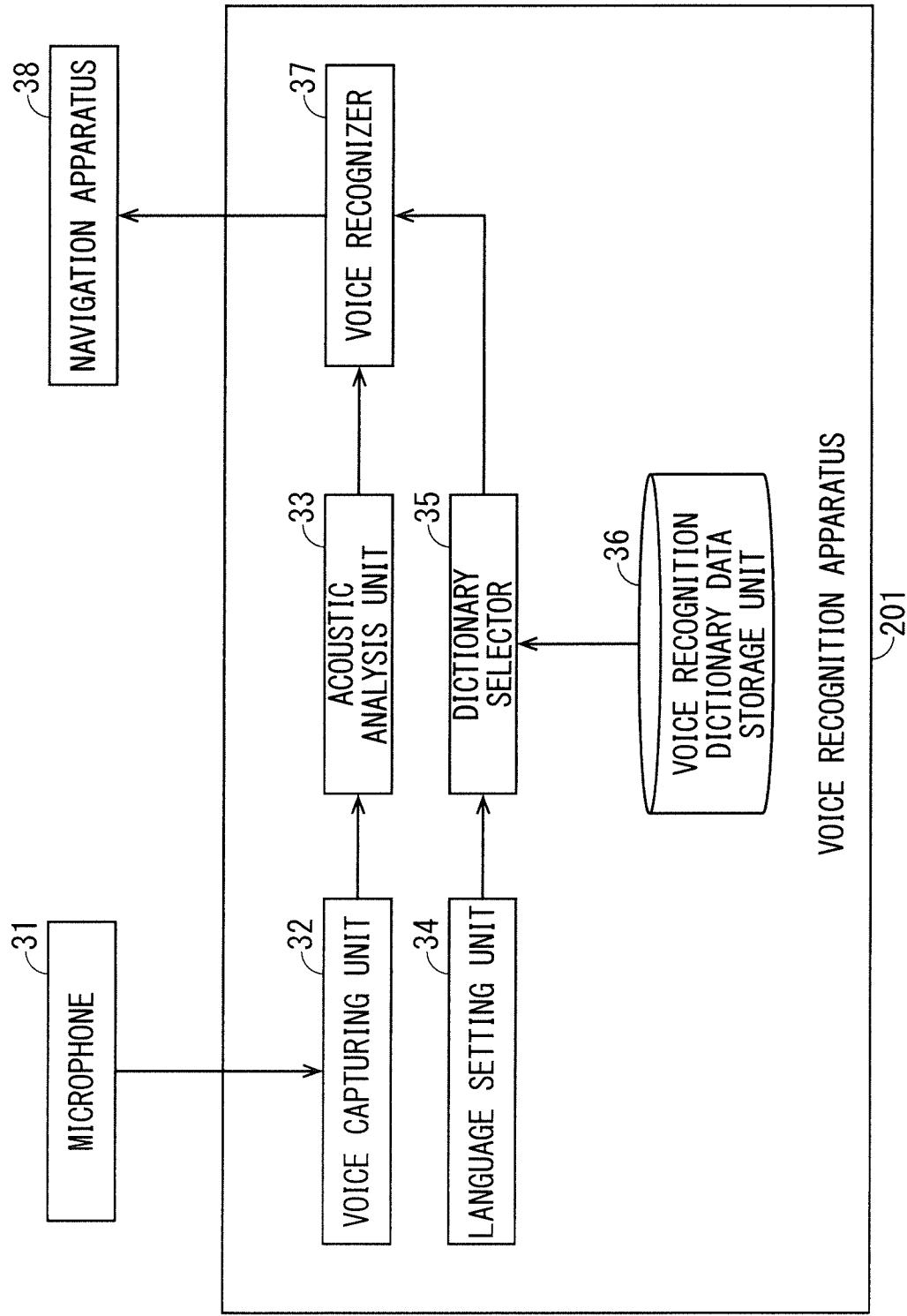
F I G. 3

F I G. 5
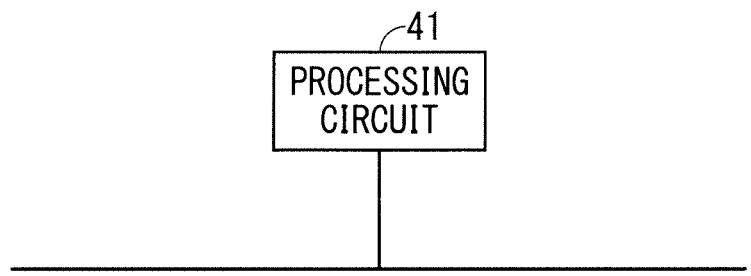
F I G. 6
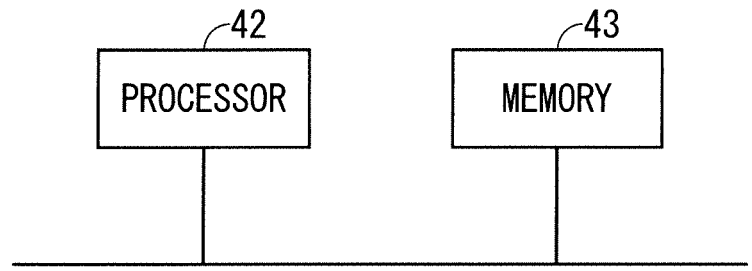

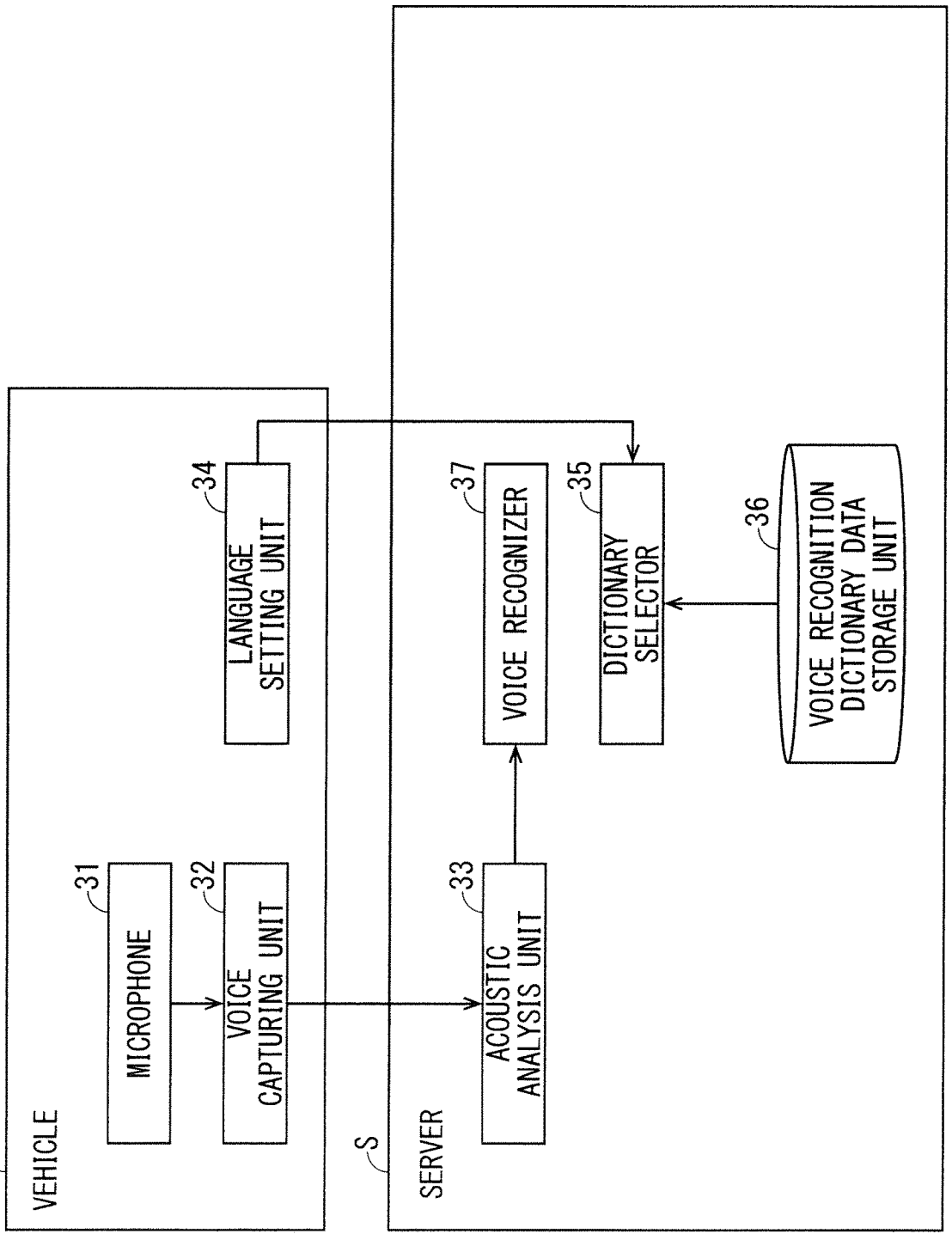

VOICE RECOGNITION DICTIONARY DATA CONSTRUCTION APPARATUS AND VOICE RECOGNITION APPARATUS

TECHNICAL FIELD

The present invention relates to a technique for constructing voice recognition dictionary data used in a navigation apparatus.

BACKGROUND ART

A conventional navigation apparatus can recognize a speaking voice of a user using voice recognition dictionary data, and execute a destination setting process and the like. In many cases, although the voice recognition dictionary data is data in which the place name of the destination and phoneme data are associated with each other, there is a case in which only the phoneme data is registered without such association.

In the voice recognition dictionary data, the phoneme data of place name is generally constructed in a language at the place of the place name (see, Patent Document 1).

For example, phoneme data of streets in France is constructed in French as follows.

1) Rue Saint-Roch Ouest
2) Allee Henri III
3) Avenue du 11 Novembre 1918

Note that the accent aigu is omitted for the first e of Allee (the same applies to Allee described later). "III" is uttered as "trois".

However, it is natural for a user whose native language is not French to utter Rue, Avenue representing streets in the above example, or Ouest representing the direction, in the native language of the user. For example, a user who speaks English is considered to speak in English of the streets in France as described above, as follows. Note, "III" of 2) is uttered as "third".

1) West Saint-Roch street
2) Henri III street
3) 11th November 1918 street

In this way, when a user being different language speaker who speaks a different language from the language spoken in the destination speaks, it is common for such a user to rephrase and utter a part of the place name of the destination with a word in the native language of the user, moreover, with a change in word order.

PRIOR ART DOCUMENTS

Patent Documents

[Patent Document 1] Japanese Patent Application Laid-Open No. 2010-091963

SUMMARY

Problem to be Solved by the Invention

In the voice recognition dictionary data of the conventional navigation apparatus such as the navigation apparatus of Patent Document 1, the phoneme data of the place name of the destination is registered only in the language at the destination, and the utterance made by the different language speaker in a way of wording in the native language of the different language speaker has not been recognized. Accordingly, the navigation apparatus has not been useful for speakers of different language.

The present invention has been made in view of the above-described problems, and an object thereof is to provide a voice recognition technique that can handle wording in other languages.

Means to Solve the Problem

The first voice recognition dictionary data construction apparatus according to the present invention is a voice recognition dictionary data construction apparatus configured to construct voice recognition dictionary data for recognizing a place name in a first language with voice in a second language in a navigation apparatus, the voice recognition dictionary data construction apparatus including an attribute setting unit configured to set attributes to first words that constitute a first character string representing the place name in the first language, a language conversion unit configured to create a second character string by extracting second words being words of the second language corresponding to the first words from a word storage unit that stores data of words of a plurality of languages including the first language and the second language, and replacing the first words in the first character string with the second words without changing the attributes thereof, an order changing unit configured to create a third character string by changing a word order of the second character string based on the attributes of the words of the second character string and a word order rule of place names of the second language, a phoneme data construction unit configured to construct phoneme data of the third character string by extracting phoneme data of words of the third character string from a phoneme storage unit that stores phoneme data of words of a plurality of languages including the second language, and a dictionary data construction unit configured to construct the voice recognition dictionary data using the phoneme data of the third character string.

The second voice recognition dictionary data construction apparatus according to the present invention is a voice recognition dictionary data construction apparatus configured to construct voice recognition dictionary data for recognizing a place name in a first language with voice in a second language in a navigation apparatus, the voice recognition dictionary data construction apparatus including an attribute setting unit configured to set attributes to first words that constitute a first character string representing the place name in the first language, an order changing unit configured to create a second character string by changing a word order of the first character string based on the attributes of the words of the first character string and a word order rule of place names of the second language, a language conversion unit configured to create a third character string by extracting second words being words of the second language corresponding to the first words from a word storage unit that stores data of words of a plurality of languages including the first language and the second language, and replacing the first words in the second character string with the second words, a phoneme data construction unit configured to construct phoneme data of the third character string by extracting phoneme data of words of the third character string from a phoneme storage unit that stores phoneme data of words of a plurality of languages including the second language, and a dictionary data construction unit configured to construct the voice recognition dictionary data using the phoneme data of the third character string.

Effects of the Invention

The first voice recognition dictionary data construction apparatus according to the present invention is a voice recognition dictionary data construction apparatus configured to construct voice recognition dictionary data for recognizing a place name in a first language with voice in a second language in a navigation apparatus, the voice recognition dictionary data construction apparatus including an attribute setting unit configured to set attributes to first words that constitute a first character string representing the place name in the first language, a language conversion unit configured to create a second character string by extracting second words being words of the second language corresponding to the first words from a word storage unit that stores data of words of a plurality of languages including the first language and the second language, and replacing the first words in the first character string with the second words without changing the attributes thereof, an order changing unit configured to create a third character string by changing a word order of the second character string based on the attributes of the words of the second character string and a word order rule of place names of the second language, a phoneme data construction unit configured to construct phoneme data of the third character string by extracting phoneme data of words of the third character string from a phoneme storage unit that stores phoneme data of words of a plurality of languages including the second language, and a dictionary data construction unit configured to construct the voice recognition dictionary data using the phoneme data of the third character string. Therefore, the voice recognition apparatus that uses the voice recognition dictionary data constructed by the voice recognition dictionary data construction apparatus ensures voice recognition even when the user utters a place name in wording of a language different from the language of the place name.

The second voice recognition dictionary data construction apparatus according to the present invention is a voice recognition dictionary data construction apparatus configured to construct voice recognition dictionary data for recognizing a place name in a first language with voice in a second language in a navigation apparatus, the voice recognition dictionary data construction apparatus including an attribute setting unit configured to set attributes to first words that constitute a first character string representing the place name in the first language, an order changing unit configured to create a second character string by changing a word order of the first character string based on the attributes of the words of the first character string and a word order rule of place names of the second language, a language conversion unit configured to create a third character string by extracting second words being words of the second language corresponding to the first words from a word storage unit that stores data of words of a plurality of languages including the first language and the second language, and replacing the first words in the second character string with the second words, a phoneme data construction unit configured to construct phoneme data of the third character string by extracting phoneme data of words of the third character string from a phoneme storage unit that stores phoneme data of words of a plurality of languages including the second language, and a dictionary data construction unit configured to construct the voice recognition dictionary data using the phoneme data of the third character string. Therefore, the voice recognition apparatus that uses the voice recognition dictionary data constructed by the voice recognition dictionary data construction apparatus ensures voice recognition even when the user utters a place name in wording of a language different from the language of the place name.

These and other objects, features, aspects and advantages of the present invention will become more apparent from the following detailed description of the present invention when taken in conjunction with the accompanying drawings.

BRIEF DESCRIPTION OF DRAWINGS

FIG. 3 A block diagram illustrating a configuration of a voice recognition apparatus according to Embodiment 2.

FIG. 5 A diagram illustrating a hardware configuration of a voice recognition dictionary data construction apparatus or a voice recognition apparatus.

FIG. 6 A diagram illustrating a hardware configuration of a voice recognition dictionary data construction apparatus or a voice recognition apparatus.

FIG. 7 A diagram illustrating a configuration example of the voice recognition apparatus according to Embodiment 2 in an in-vehicle apparatus and a server.

DESCRIPTION OF EMBODIMENTS

A. Embodiment 1

A-1. Configuration

Figure 1:
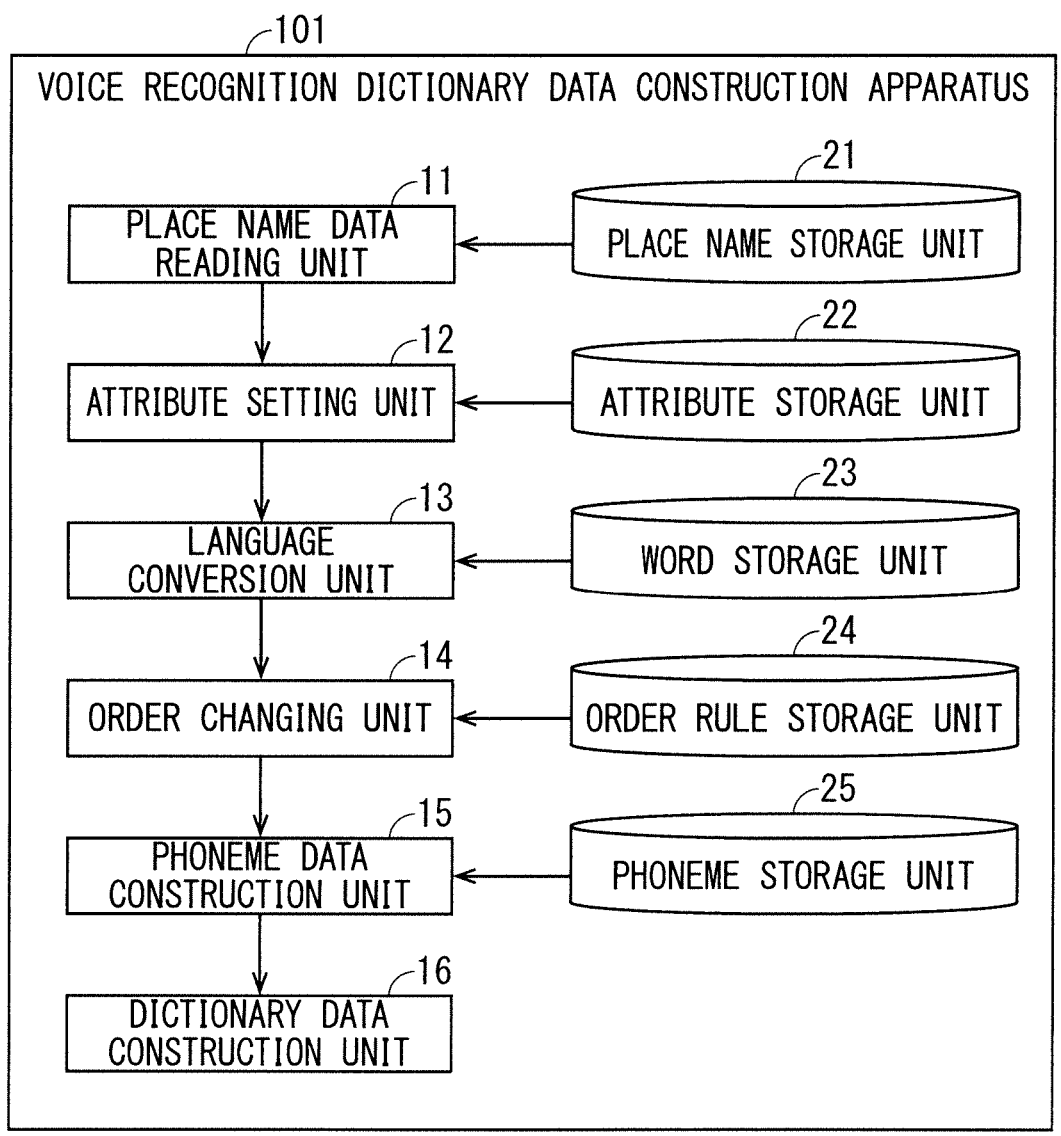
FIG. 1 A block diagram illustrating a configuration of a voice recognition dictionary data construction apparatus according to Embodiment 1.

FIG. 1 is a block diagram illustrating a configuration of a voice recognition dictionary data construction apparatus 101 according to Embodiment 1. The voice recognition dictionary data construction apparatus 101 constructs voice recognition dictionary data used for voice recognition in a navigation apparatus.

The voice recognition dictionary data construction apparatus 101 includes a place name data reading unit 11, an attribute setting unit 12, a language conversion unit 13, an order changing unit 14, a phoneme data construction unit 15, and a dictionary data construction unit 16. Further, the voice recognition dictionary data construction apparatus 101 includes a place name storage unit 21, an attribute storage unit 22, a word storage unit 23, an order rule storage unit 24, and a phoneme storage unit 25.

The place name storage unit 21 stores place name data. The place name data is, for example, a character string of place name. The place name storage unit 21 may store place name data in one language, or place name data in a plurality of languages. Taking French place name data as an example, "Rue Saint-Roch Ouest", "allee Henri III" and the like are stored in the place name storage unit 21.

The place name data reading unit 11 reads place name data from the place name storage unit 21. For the place name data read by the place name data reading unit 11, the voice recognition dictionary data construction apparatus 101 constructs voice recognition dictionary data. For the place name data read by the place name data reading unit 11, the language of the place name is the first language, and the character string representing the place name is the first character string.

The attribute storage unit 22 stores attribute data in which words and their attributes are associated with each other. The attribute data may associate with one language or a plurality of languages, but the attribute data at least needs to associate with the language of the place name data stored in the place name storage unit 21. Taking French words as an example, the correspondence in that the attribute of "Rue" and "Allee" is "place name type", the attribute of "West" and "East" is "direction", and the attribute of "I", "II", "1st" and "2nd" is "ordinal number" is described in the attribute data.

The attribute setting unit 12 acquires the first character string from the place name data reading unit 11, and divides the first character string into words. Then, the attribute setting unit 12 refers to the attribute data in the attribute storage unit 22, and gives an attribute to each word of the first character string according to the attribute data.

The word storage unit 23 stores word data in which words in the first language and words in the second language are associated with each other. The second language is a language used for voice recognition, and may include one language or a plurality of languages. For example, if the first language is French and the second language includes English, German, and Chinese, a French-to-English word conversion table, French-to-German word conversion table, and French-to-Chinese word conversion table are provided as word data. In the French-to-English word conversion table, for example, "Rue" is converted to "Street", "Allee" is converted to "Driveway", "Ouest" is converted to "West", and "Est" is converted to "East". Note that proper nouns such as "Henri" cannot be converted to other languages, and thus are not described in the word data.

The language conversion unit 13 refers to the word data in the word storage unit 23 and converts each word in the first language of the first character string to the second language. Note that proper nouns among the words in the first language of the first character string are not converted to the second language because no word association is described in the word data. In the word data, the data may be aligned for each word attribute. In this case, the language conversion unit 13 can extract second language words from the word data at high speed based on the word attribute. The character string after language conversion by the language conversion unit 13 is referred to as a second character string. That is, the second character string is obtained by converting the element words in the first character string from the first language to the second language.

The order rule storage unit 24 stores word order rules of place names for each language. For example, the English order rule stipulates that a word of the "azimuth" attribute is arranged first and a word of the "place name category" attribute is arranged last. Although, the order rule storage unit 24 may store an order rule for one language, or may store order rules for a plurality of languages, at least an order rule for a second language is stored therein.

The order changing unit 14 refers to the order rule of the second language stored in the order rule storage unit 24, and changes the word order in the second character string. The character string after the word order is changed is referred to as the third character string.

The phoneme storage unit 25 stores at least phoneme data of the words in the second language. The phoneme storage unit 25 may store phoneme data of the words in the first language. The phoneme data is data representing the pronunciation of words, and is represented by phonetic characters such as katakana and pronunciation symbols.

The phoneme data construction unit 15 constructs phoneme data of the third character string with reference to the phoneme data stored in the phoneme storage unit 25. Specifically, the phoneme of the third character string is created by connecting the phonemes of the words in the third character string.

The dictionary data construction unit 16 constructs voice recognition dictionary data using the phoneme data of the third character string. The voice recognition dictionary data is data compiled into a format suitable for voice recognition. In the voice recognition dictionary data, although it is desirable that the phoneme data of the third character string is associated with the first character string, such association is not essential.

In FIG. 1, the place name storage unit 21, the attribute storage unit 22, the word storage unit 23, the order rule storage unit 24, and the phoneme storage unit 25 are illustrated as the configuration of the voice recognition dictionary data construction apparatus 101. However, these configurations may be configured by a server or the like outside the voice recognition dictionary data construction apparatus 101.

A-2. Operation

Figure 2:
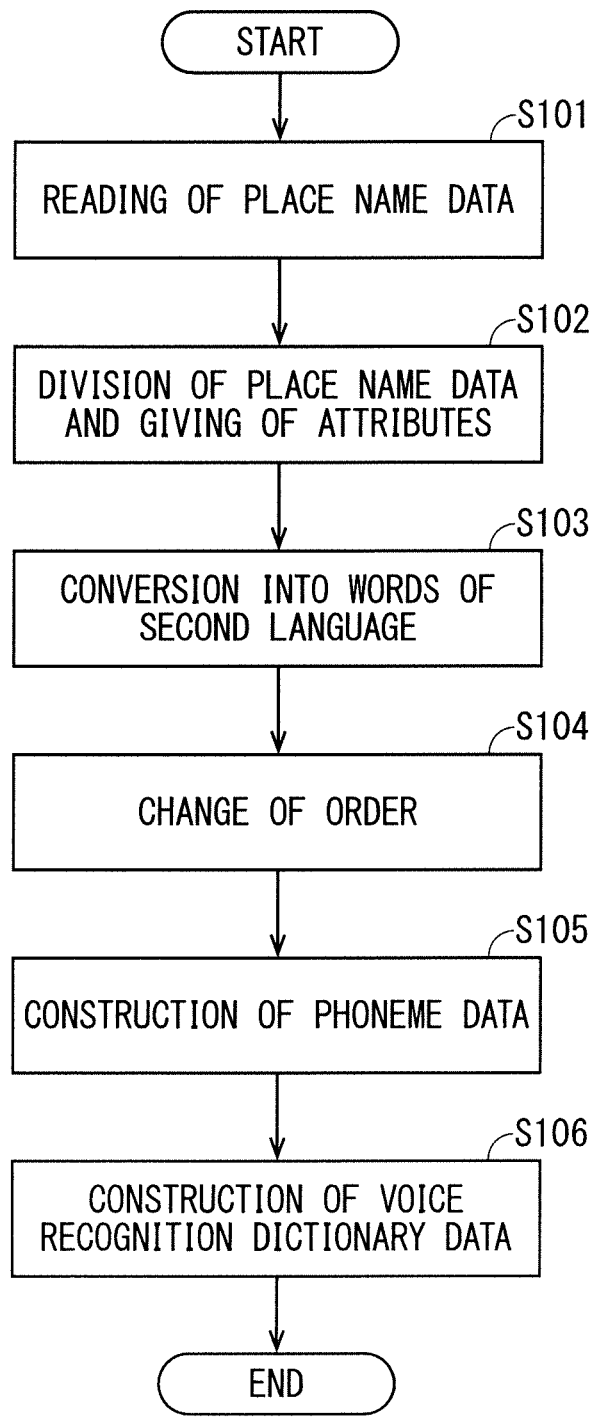
FIG. 2 A flowchart illustrating construction processing of voice recognition dictionary data by the voice recognition dictionary data construction apparatus according to Embodiment 1.

FIG. 2 is a flowchart illustrating construction processing of voice recognition dictionary data by the voice recognition dictionary data construction apparatus 101. The processing for constructing English voice recognition dictionary data for the place name in French "Rue Traversiere-Ouest" will be described below with reference to FIG. 2. For the second e of "Traversiere", the accent aigu is omitted.

First, the place name data reading unit 11 reads the place name data from the place name storage unit 21 (Step S101). Here, the place name data read by the place name data reading unit 11 is a character string (first character string) representing a place name in French (first language) "Rue Traversiere-Ouest".

Next, the attribute setting unit 12 divides "Rue Traversiere-Ouest" into words, that is, "Rue", "Traversiere", and "Ouest". Then, the attribute setting unit 12 refers to the attribute data in the attribute storage unit 22 and gives attributes to "Rue", "Traversiere", and "Ouest" (Step S102). Here, the "place name category" attribute is given to "Rue", the "proper noun" attribute is given to "Traversiere", and the "azimuth" attribute is given to "Ouest". In addition, the attributes include "date", "color designation part", "upper and lower designation part", "radix designation part", "ordinal number designation part", and the like. For example, "11th November 1918" of "11th November 1918 street" has the "date" attribute. Further, "upper" or "lower" of the place names in Kyoto has the attribute of "upper and lower designation part". In addition, "III" of "Henri III street" has the attribute of "ordinal number designation part".

Next, the language conversion unit 13 converts the words constituting "Rue Traversiere-Ouest" into words of the second language (Step S103). Specifically, referring to the word data stored in the word storage unit 23, "street" and "West", corresponding to "Rue" and "Ouest", that is, English words (second language) having the same meaning, are extracted. In "Rue Traversiere-Ouest", "Rue" is replaced with "street" and "Ouest" is replaced with "West" to obtain "street Traversiere West". The character string after the replacement with the English words is the second character string. Note that "Traversiere" is a proper noun, so there is no corresponding English word; therefore, replacement with any English word is not performed.

Next, the order changing unit 14 changes the order of the words in the second character string "street Traversiere West" in accordance with the word order rule of the English place names (Step S104). The word order rule of English place names is stored in the order rule storage unit 24. The English word order rule for place names stipulates that a word of the "azimuth" attribute is arranged first and a word of the "place name category" attribute is arranged last. Therefore, the order changing unit 14 arranges the word "street" having the "place name category" attribute at the end of the character string, and arranges the word "West" having the "azimuth" attribute at the beginning of the character string. As a result, the second character string "street Traversiere West" becomes the third character string "West Traversiere street".

Next, the phoneme data construction unit 15 constructs phoneme data of the third character string "West Traversiere street" (Step S105). Specifically, the phoneme data construction unit 15 extracts each piece of phoneme data of "West", "Traversiere", and "street" from the phoneme storage unit 25, and connects the pieces of phoneme data to form the third character string "West Traversiere street".

Next, the dictionary data construction unit 16 constructs voice recognition dictionary data by converting the phoneme data of the third character string "West Traversiere street" into data in a format suitable for voice recognition (Step S106). In the voice recognition dictionary data, the phoneme data of the third character string "West Traversiere street" may be associated with the first character string "Rue Traversiere-Ouest".

Thus, the voice recognition dictionary data construction processing by the voice recognition dictionary data construction apparatus 101 is completed. The processing for constructing English voice recognition dictionary data for the French place name has been described. However, the voice recognition dictionary data construction apparatus 101 may construct voice recognition dictionary data for a plurality of other languages such as German or Chinese. In which language the voice recognition dictionary data is to be constructed may be determined in advance, or may be appropriately designated by the user.

A-3. Effect

The voice recognition dictionary data construction apparatus 101 according to Embodiment 1 constructs voice recognition dictionary data for recognizing a place name in the first language with voice in the second language in the navigation apparatus. The voice recognition dictionary data construction apparatus 101 includes the attribute setting unit 12 that sets attributes to the first words constituting the first character string representing the place name in the first language, the language conversion unit 13 that creates the second character string by extracting second words being second language words corresponding to the first words from the word storage unit 23 that stores word data of a plurality of languages including the first language and the second language, and replacing the first words in the first character string with the second words without changing the attributes thereof, the order changing unit 14 that creates the third character string by changing the word order of the second character string based on the attributes of the words of the second character string and the word order rule of place names of the second language, the phoneme data construction unit 15 that constructs the phoneme data of the third character string by extracting the phoneme data of the words of the third character string from the phoneme storage unit 25 that stores phoneme data of words of a plurality of languages including the second language, and the dictionary data construction unit 16 that constructs the voice recognition dictionary data using the phoneme data of the third character string. Therefore, the voice recognition apparatus that uses the voice recognition dictionary data constructed by the voice recognition dictionary data construction apparatus 101 ensures voice recognition even when the user utters the place name in wording of a language (second language) different from the language of the place name (first language).

The voice recognition dictionary data is data in which the phoneme data of the third character string is associated with the first character string. Therefore, the voice recognition apparatus that uses the voice recognition dictionary data constructed by the voice recognition dictionary data construction apparatus 101 ensures voice recognition even when the user utters the place name in wording of a language (second language) different from the language of the place name (first language).

Further, the attribute to be given to the words by the attribute setting unit 12 includes any of a proper noun, a place name category, a direction name, and a date. Therefore, the voice recognition dictionary data construction apparatus 101 constructs voice recognition dictionary data in consideration of the word order rules in each language according to such attributes. Therefore, the voice recognition apparatus that uses the voice recognition dictionary data constructed by the voice recognition dictionary data construction apparatus 101 ensures voice recognition even when the user utters the place name in wording of a language (second language) different from the language of the place name (first language).

In addition, the language conversion unit 13 creates the second character string by replacing words having the attributes other than the proper noun attribute with the second words without changing words having the proper noun attribute among the first words constituting the first character string. Therefore, the voice recognition apparatus that uses the voice recognition dictionary data constructed by the voice recognition dictionary data construction apparatus 101 ensures appropriate voice recognition even when a second language speaker utters the place name in the first language with pronunciation of the second language in a word order specific to the second language.

When the second language includes a plurality of languages, the dictionary data construction unit 16 constructs voice recognition dictionary data for each language. Therefore, the voice recognition apparatus that uses the voice recognition dictionary data is capable of voice recognition in dealing with speakers with a plurality of languages.

In the flow of FIG. 2, after the language conversion process by the language conversion unit 13 (Step S103), the order changing process in the order changing unit 14 has been performed (Step S104). However, the language conversion process by the language conversion unit 13 may be performed after the order changing process in the order changing unit 14. In this case, the voice recognition dictionary data construction apparatus 101 according to Embodiment 1 includes the attribute setting unit 12 that sets attributes to the first words constituting the first character string representing the place name in the first language, the order changing unit 14 that creates the second character string by changing the word order of the first character string based on the attributes of the words of the first character string and the word order rule of place names of the second language, the language conversion unit 13 that creates the third character string by extracting second words being second language words corresponding to the first words from the word storage unit 23 that stores word data of a plurality of languages including the first language and the second language, and replacing the first word in the second character string with the second word, the phoneme data construction unit 15 that constructs the phoneme data of the third character string by extracting the phoneme data of the words of the third character string from the phoneme storage unit 25 that stores phoneme data of words of a plurality of languages including the second language, and the dictionary data construction unit 16 that constructs the voice recognition dictionary data using the phoneme data of the third character string. Therefore, the voice recognition apparatus that uses the voice recognition dictionary data constructed by the voice recognition dictionary data construction apparatus 101 ensures appropriate voice recognition even when a second language speaker utters the place name in the first language with pronunciation of the second language in a word order specific to the second language.

Further, a voice recognition dictionary data construction method according to Embodiment 1 is a voice recognition dictionary data construction method for constructing the voice recognition dictionary data for recognizing a place name in the first language with voice in the second language in the navigation apparatus. The voice recognition dictionary data construction method according to Embodiment 1 including setting the attributes to the first words that constitute the first character string representing the place name in the first language, extracting the second words being the second language word corresponding to the first words from the word storage unit 23 that stores word data of a plurality of languages including the first language and the second language, replacing the first words in the first character string with the second words without changing the attributes thereof, creating the third character string by changing the word order of the second character string based on the attributes of the words of the second character string and the word order rule of the second language, constructing phoneme data of the third character string by extracting phoneme data of the words of the third character string from the phoneme storage unit 25 that stores the phoneme data of words of a plurality of languages including the second language, and constructing the voice recognition dictionary data using the phoneme data of the third character string. Therefore, the voice recognition apparatus that uses the voice recognition dictionary data ensures appropriate voice recognition even when a second language speaker utters the place name in the first language with pronunciation of the second language in a word order specific to the second language.

B. Embodiment 2

B-1. Configuration

FIG. 3 is a block diagram illustrating a configuration of voice recognition apparatus 201 according to Embodiment 2. The voice recognition apparatus 201 performs voice recognition using the voice recognition dictionary data constructed by the voice recognition dictionary data construction apparatus 101 of Embodiment 1.

The voice recognition apparatus 201 includes a voice capturing unit 32, an acoustic analysis unit 33, a language setting unit 34, a dictionary selection unit 35, a voice recognition dictionary data storage unit 36, and a voice recognizer 37. The voice recognition apparatus 201 is connected to a microphone 31 and a navigation apparatus 38, and is configured to be able to use them.

The navigation apparatus 38 is an apparatus that performs route guidance for a vehicle or the like, and is mounted on the vehicle, for example. The microphone 31 is installed in the vehicle for which the navigation apparatus 38 performs route guidance or the like, and acquires the voice of the passenger of the vehicle.

The voice capturing unit 32 creates a voice signal by converting the voice acquired by the microphone 31 into a digital signal.

The acoustic analysis unit 33 analyzes the voice signal and converts the signal into a time series of acoustic feature amounts. The acoustic feature amount is, for example, a frequency component, a volume or the like.

The language setting unit 34 sets a user language. The user language is a language spoken by the user. The user language is set in response to operation by the user, for example. In this case, the language setting unit 34 acquires user operation information from an input unit (not shown), and sets the user language based on the operation information.

Alternatively, the user language is set based on the speaking voice of the user. In this case, the voice recognizer 37 uses the voice recognition dictionary data in a plurality of languages stored in the voice recognition dictionary data storage unit 36 to identify the word closest to the voice acquired from the microphone 31, and estimates that the language of the word is the user language.

However, according to the method, the voice recognizer 37 is required to process a huge number of pieces of voice recognition dictionary data. Therefore, it is desirable to first let the user to say a word having a specific meaning and to estimate the user language from the speaking voice. For example, the voice recognition apparatus 201 outputs a voice saying "Please greet in your favorite language" from a speaker (not shown) mounted on the vehicle, and prompts the user to say a word of greeting. And then, the voice recognizer 37 estimates the user language from the voice acquired by the microphone 31. Thus, the range of data processing by the voice recognizer 37 is limited to the voice recognition dictionary data related to "greeting".

The voice recognition dictionary data storage unit 36 stores the voice recognition dictionary data of a plurality of languages constructed by the voice recognition dictionary data construction apparatus 101 of Embodiment 1. The dictionary selection unit 35 extracts the voice recognition dictionary data in the user language from the voice recognition dictionary data storage unit 36 and outputs the data to the voice recognizer 37.

The voice recognizer 37 recognizes the voice acquired by the microphone 31 using the voice recognition dictionary data in the user language. Specifically, the voice recognizer 37 extracts a place name having a feature closest to the analysis result of the voice signal by the acoustic analysis unit 33 from the voice recognition dictionary data, and outputs the place name to the navigation apparatus 38 as a recognition result.

B-2. Operation

Figure 4:
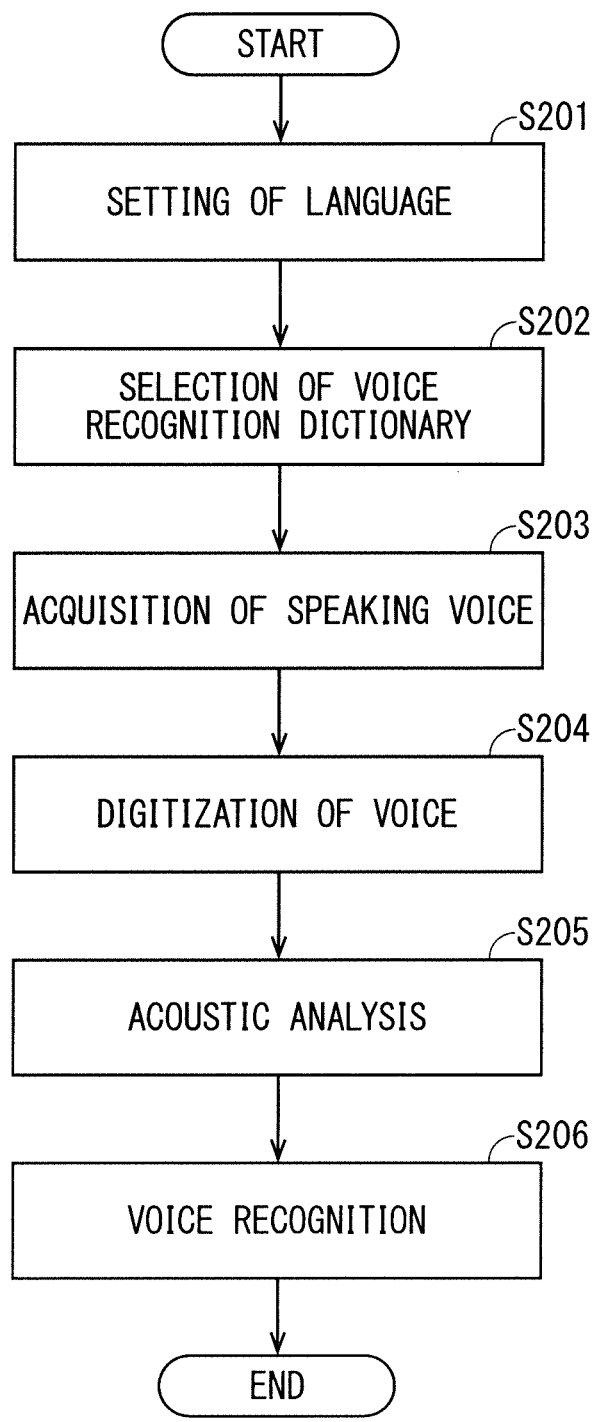
FIG. 4 A flowchart illustrating voice recognition processing by the voice recognition apparatus according to Embodiment 2.

FIG. 4 is a flowchart of voice recognition processing by the voice recognition apparatus 201. Hereinafter, the voice recognition processing by the voice recognition apparatus 201 will be described with reference to FIG. 4.

First, the language setting unit 34 sets the user language (Step S201).

Next, the dictionary selection unit 35 selects a voice recognition dictionary for the user language (Step S202). Specifically, the dictionary selection unit 35 takes out the voice recognition dictionary data of the user language from the voice recognition dictionary data storage unit 36 and provides the data to the voice recognizer 37.

And, the microphone 31 acquires speaking voice of the user (Step S203). Then, the speaking voice of the user is converted to a digital signal by the voice capturing unit 32 (Step S204). And further, the signal is subject to acoustic analysis in the acoustic analysis unit 33 (Step S205).

Then, the voice recognizer 37 performs voice recognition by extracting the place name closest to the acoustic analysis result of the acoustic analysis unit 33 from the voice recognition dictionary data in the user language (Step S206). The voice recognizer 37 outputs the voice recognition result to the navigation apparatus 38. Thus, the voice recognition processing by the voice recognition apparatus 201 is completed.

B-3. Effect

The voice recognition apparatus 201 according to Embodiment 2 includes the dictionary selection unit 35 that selects voice recognition dictionary data of one language from the voice recognition dictionary data of a plurality of languages constructed by the voice recognition dictionary data construction apparatus 101, the voice capturing unit 32 being a voice receiver that acquires speaking voice of the user, and the voice recognizer 37 that performs voice recognition of speaking voice using the voice recognition dictionary data selected by the dictionary selection unit 35. Therefore, according to the voice recognition apparatus 201, voice recognition is performable even when the user says a place name in a way of wording in a language different from the language of the place name.

C. Configuration of Hardware

The place name data reading unit 11, the attribute setting unit 12, the language conversion unit 13, the order changing unit 14, the phoneme data construction unit 15, the dictionary data construction unit 16, the place name storage unit 21, the attribute storage unit 22, the word storage unit 23, the order rule storage unit 24, and the phoneme storage unit 25 in the voice recognition dictionary data construction apparatus 101 and the voice capturing unit 32, the acoustic analysis unit 33, the language setting unit 34, the, the dictionary selection unit 35, the voice recognition dictionary data storage unit 36, and the voice recognizer 37 in the voice recognition apparatus 201 described above are realized by a processing circuit 41 illustrated in FIG. 5.

That is, the processing circuit 41 includes the place name data reading unit 11, the attribute setting unit 12, the language conversion unit 13, the order changing unit 14, the phoneme data construction unit 15, the dictionary data construction unit 16, the place name storage unit 21, the attribute storage unit 22, the word storage unit 23, the order rule storage unit 24, and the phoneme storage unit 25 (hereinafter referred to as "attribute setting unit 12 etc.") and the voice capturing unit 32, the acoustic analysis unit 33, the language setting unit 34, the, the dictionary selection unit 35, the voice recognition dictionary data storage unit 36, and the voice recognizer 37 (hereinafter referred to as "voice recognizer 37 etc."). Dedicated hardware may be applied to the processing circuit 41, or a processor that executes a program stored in the memory may be applied. The processor is, for example, a central processing unit, a processing unit, an arithmetic unit, a microprocessor, a microcomputer, a Digital Signal Processor (DSP), or the like.

When dedicated hardware is applied to the processing circuit 41, a single circuit, a composite circuit, a programmed processor, a parallel programed processor. an Application Specific Integrated Circuit (ASIC), a Field-Programmable Gate Array (FPGA), and combinations thereof correspond to the processing circuit 41. Each of functions of the attribute setting unit 12 or the voice recognizer 37 may be realized by a plurality of processing circuits, or may be realized by one processing circuit with each of the functions of the respective parts are integrated.

When the processing circuit 41 is a processor, the function of the attribute setting unit 12 or the like or the voice recognizer 37 or the like is realized by a combination with software or the like (software, firmware or software and firmware). Software or the like is described as a program and stored in a memory. As illustrated in FIG. 6, a processor 42 applied to the processing circuit 41 realizes the functions of the respective units by reading out and executing the program stored in a memory 43.

the voice recognition dictionary data construction apparatus 101 includes the memory 43 that stores a program that executes a step of setting the attributes to the first words constituting the first character string representing the place name of the first language, a step of extracting the second words being words in the second language corresponding to the first words from the word storage unit 23 that stores word data in a plurality of languages including the first language and the second language, a step of creating the second character string by replacing the first words of the first character string with the second words without changing attributes, a step of creating the third character string by switching the order of the words in the second character string based on the attributes of the words in the second character string and the word order rule in the second language, a step of extracting the phoneme data of the words in the third character string from the phoneme storage unit 25 that stores the phoneme data of the words of a plurality of languages including the second language, and constructing the phoneme data of the third character string, and a step of constructing the voice recognition dictionary data using the phoneme data of the third character string, when the processing circuit 41 is executed.

The voice recognition apparatus 201 includes the memory 43 that stores a program that executes a step of selecting voice recognition dictionary data of one language from the voice recognition dictionary data of a plurality of languages constructed by the voice recognition dictionary data construction apparatus 101, a step of acquiring speaking voice of the user, and a step of performing voice recognition of speaking voice using the selected voice recognition dictionary data, when the processing circuit 41 is executed.

In other words, it can be said that these programs cause the computer to execute procedures and methods of the attribute setting unit 12, the voice recognizer 37 or the like. Here, a nonvolatile or volatile semiconductor memory such as Random Access Memory (RAM), Read Only Memory (ROM), flash memory, Erasable Programmable Read Only Memory (EPROM), Electrically Erasable Programmable Read Only Memory (EEPROM), and a Hard Disk Drive (HDD), a magnetic disk, a flexible disk, an optical disk, a compact disk, a minidisk, Digital Versatile Disk (DVD), and a drive apparatus thereof and so forth or any storage media used in the future may be applied to the memory 43.

The configuration in which each function of the attribute setting unit 12 or the like or the voice recognizer 37 or the like is realized by either hardware or software has been described above. However, the present invention is not limited thereto, and a configuration in which part of the attribute setting unit 12 or the voice recognizer 37 or the like is realized by dedicated hardware and another part is realized by software or the like. For example, the function of the voice recognizer 37 is realized by a processing circuit as dedicated hardware, and otherwise, the processing circuit 41 as the processor 42 reads and executes the program stored in the memory 43, thereby the functions can be realized.

As described above, the processing circuit can realize the functions described above by hardware, software, or the like, or a combination thereof. Note that, although the voice recognition dictionary data storage unit 36 is composed of the memory 43, they may be composed of a single memory 43, or may be composed of individual memories.

Also, the voice recognition apparatus 201 is also applicable to a voice recognition system constructed as a system by appropriately combining an in-vehicle apparatus, a Portable Navigation Device (PND), a communication terminal (for example, a mobile terminal such as a mobile phone, a smartphone, and a tablet), functions of an application to be installed therein, and a server in addition to being configured as an in-vehicle apparatus. In this case, each function or each component of the voice recognition apparatus 201 described above may be distributed and arranged in each apparatus that constructs the voice recognition system, or may be integrated in any apparatus. FIG. 7 illustrates a configuration example of the voice recognition apparatus 201 in an in-vehicle apparatus and a server S. In this example, the microphone 31, the voice capturing unit 32, and the language setting unit 34 are arranged in the vehicle A, the acoustic analysis unit 33, the language setting unit 34, the dictionary selection unit 35, the voice recognition dictionary data storage unit 36, and the voice recognizer 37 are arranged in the server.

It should be noted that Embodiments of the present invention can be appropriately modified or omitted without departing from the scope of the invention. While the invention has been described in detail, the forgoing description is in all aspects illustrative and not restrictive. It is understood that numerous other modifications and variations can be devised without departing from the scope of the invention.

EXPLANATION OF REFERENCE SIGNS 11 place name data reading unit, 12 attribute setting unit, 13 language conversion unit, 14 order changing unit, 15 phoneme data construction unit, 16 dictionary data construction unit, 21 place name storage unit, 22 attribute storage unit, 23 word storage unit, 24 order rule storage unit, 25 phoneme storage unit, 31 microphone, 32 voice capturing unit, 33 acoustic analysis unit, 34 language setting unit, 35 dictionary selection unit, 36 voice recognition dictionary data storage unit, 37 voice recognizer, 38 navigation apparatus, 41 processing circuit, 42 processor, 43 memory, 101 voice recognition dictionary data construction apparatus, 201 voice recognition apparatus

The invention claimed is:

1. A voice recognition dictionary data construction apparatus configured to construct voice recognition dictionary data for recognizing a place name in a first language with voice in a second language in a navigation apparatus, the voice recognition dictionary data construction apparatus comprising:
    a processor to execute a program; and
        a memory to store the program which, when executed by the processor, performs processes of,
        setting attributes to first words that constitute a first character string representing the place name in the first language;
        creating a second character string by extracting second words being words of the second language corresponding to the first words from a word storage unit that stores data of words of a plurality of languages including the first language and the second language, and replacing the first words in the first character string with the second words without changing the attributes thereof;
        creating a third character string by changing a word order of the second character string based on the attributes of the words of the second character string and a word order rule of place names of the second language;
        constructing phoneme data of the third character string by extracting phoneme data of words of the third character string from a phoneme storage unit that stores phoneme data of words of a plurality of languages including the second language; and
        constructing the voice recognition dictionary data using the phoneme data of the third character string.

2. The voice recognition dictionary data construction apparatus according to claim 1, wherein
    the voice recognition dictionary data is data in which the phoneme data of the third character string is associated with the first character string.

3. The voice recognition dictionary data construction apparatus according to claim 1, wherein
    the attributes to be given to the words includes any of a proper noun, a place name category, a direction name, and a date.

4. The voice recognition dictionary data construction apparatus according to claim 3, wherein
    the second character string is created by replacing words having the attributes other than the attribute of proper noun with the second words without changing words having the attribute of proper noun among the first words constituting the first character string.

5. The voice recognition dictionary data construction apparatus according to claim 1, wherein
    the second language includes a plurality of languages, and the voice recognition dictionary data is constructed for each language.

6. A voice recognition apparatus, comprising:
    a dictionary selector configured to select voice recognition dictionary data of one language from the voice recognition dictionary data of a plurality of languages constructed by the voice recognition dictionary data construction apparatus according to claim 5;
    a voice receiver configured to acquire speaking voice of a user; and
    a voice recognizer configured to perform voice recognition of speaking voice using the voice recognition dictionary data selected by the dictionary selector.

7. A voice recognition dictionary data construction apparatus configured to construct voice recognition dictionary data for recognizing a place name in a first language with voice in a second language in a navigation apparatus, the voice recognition dictionary data construction apparatus comprising:

a processor to execute a program; and
a memory to store the program which, when executed by the processor, performs processes of,
setting attributes to first words that constitute a first character string representing the place name in the first language;
creating a second character string by changing a word order of the first character string based on the attributes of the words of the first character string and a word order rule of place names of the second language;
creating a third character string by extracting second words being words of the second language corresponding to the first words from a word storage unit that stores data of words of a plurality of languages including the first language and the second language, and replacing the first words in the second character string with the second words;
constructing phoneme data of the third character string by extracting phoneme data of words of the third character string from a phoneme storage unit that stores phoneme data of words of a plurality of languages including the second language; and
constructing the voice recognition dictionary data using the phoneme data of the third character string.

* * * * *